Inventor
Stanley G. Murray
John DeLotto

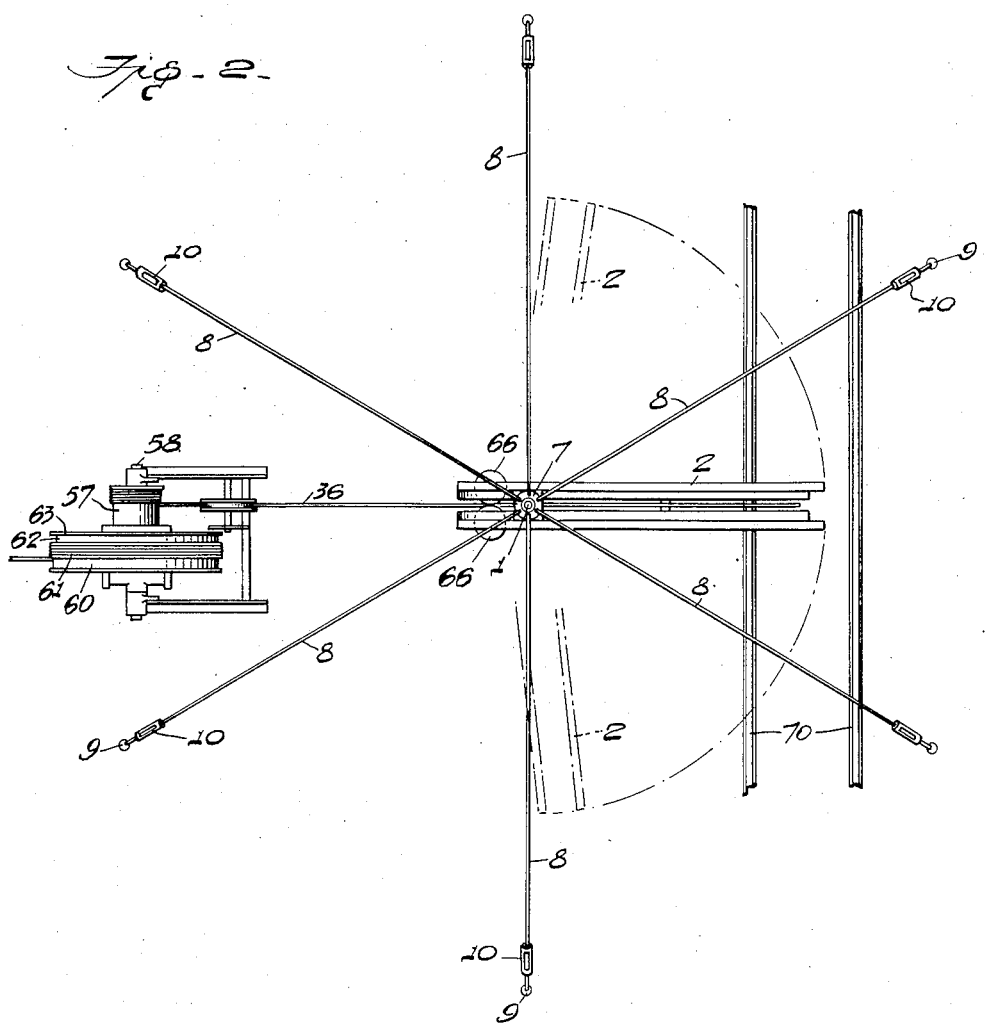
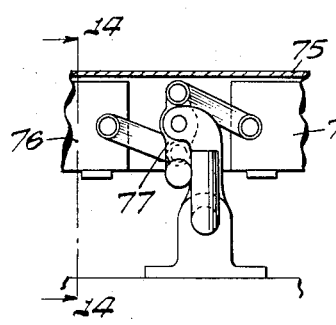
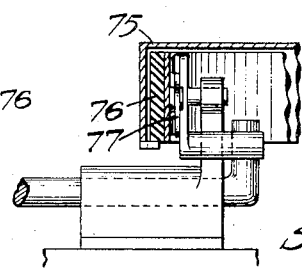

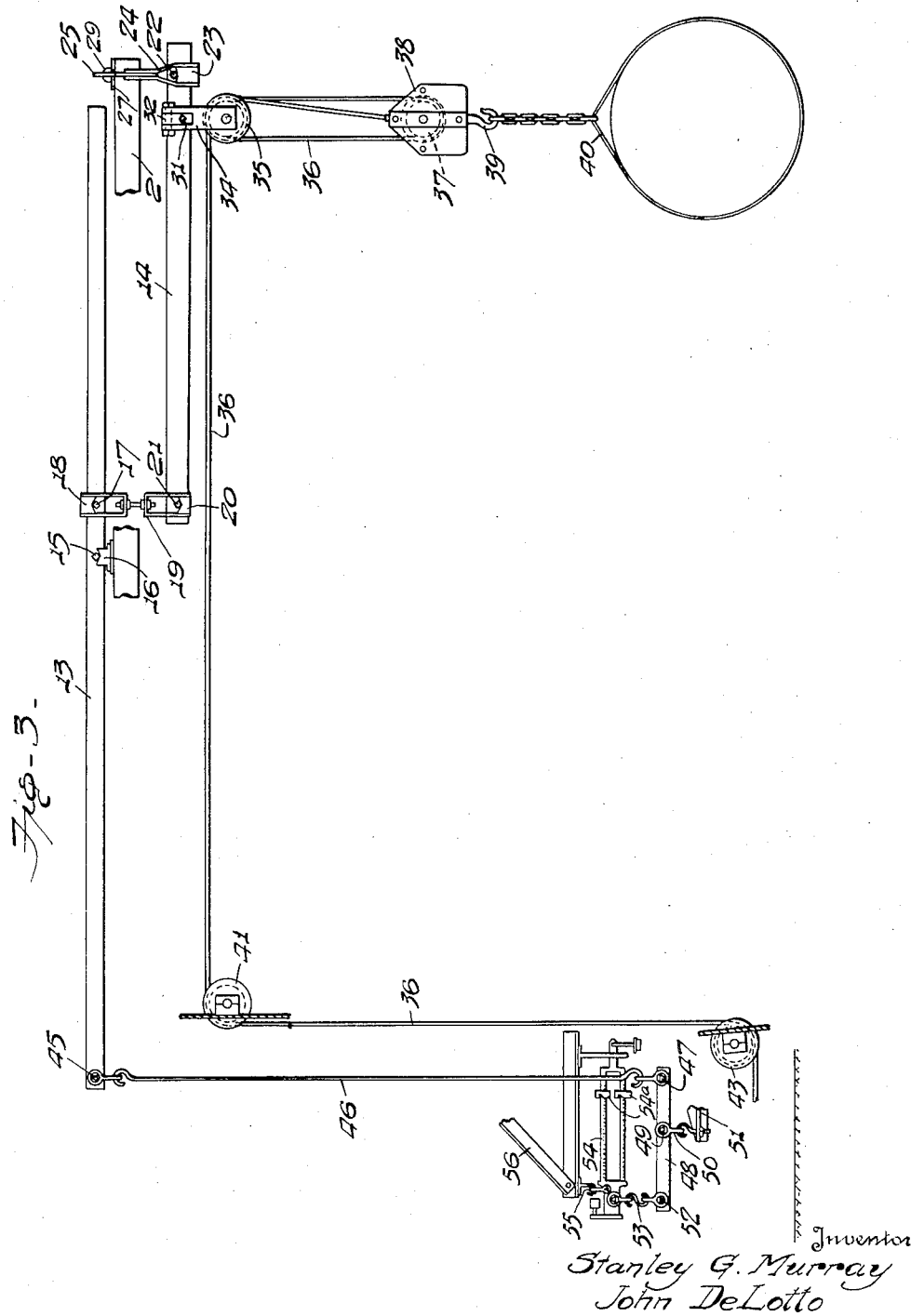

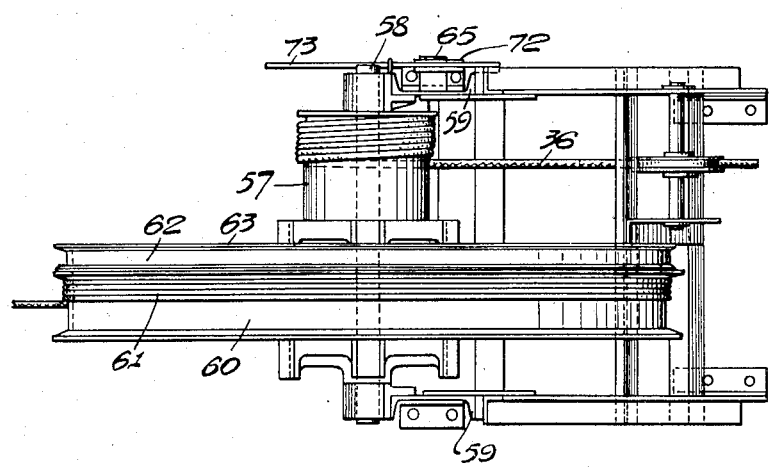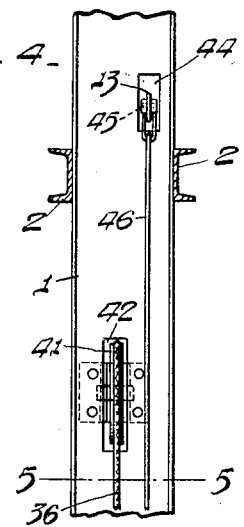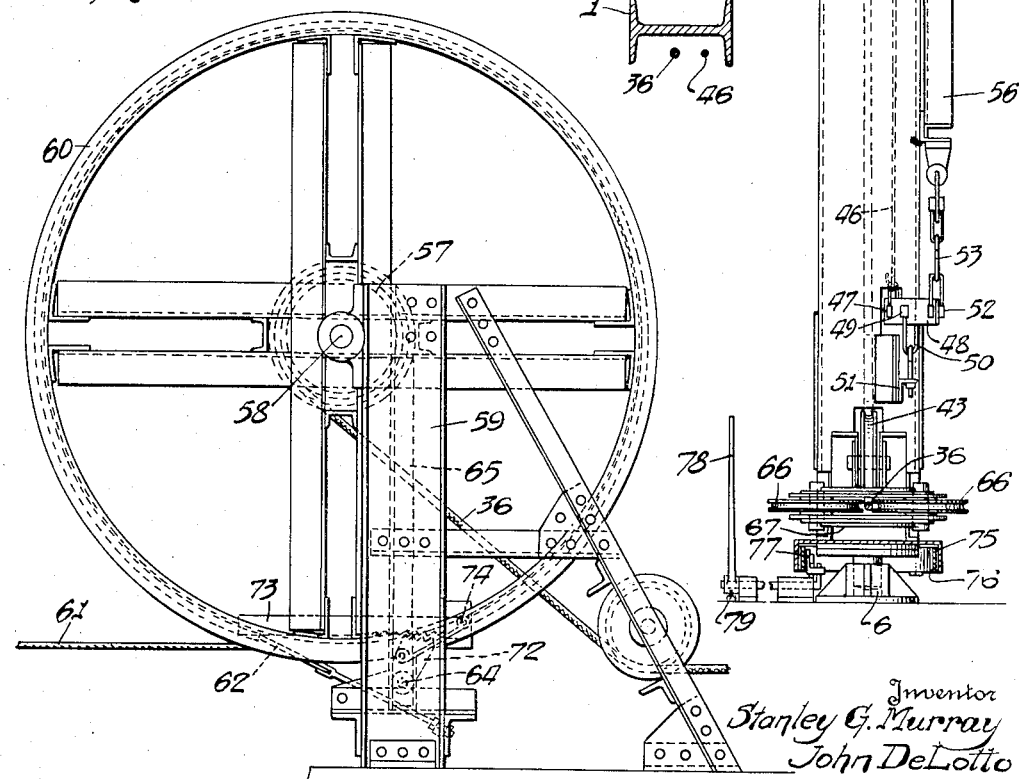

Sept. 5, 1933.  S. G. MURRAY ET AL  1,925,773
BOOM SCALE
Filed May 27, 1931   5 Sheets-Sheet 5
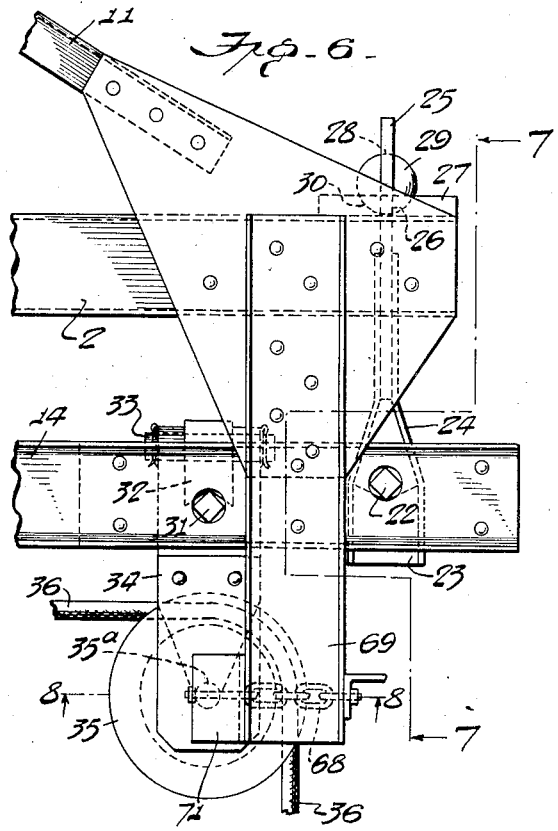
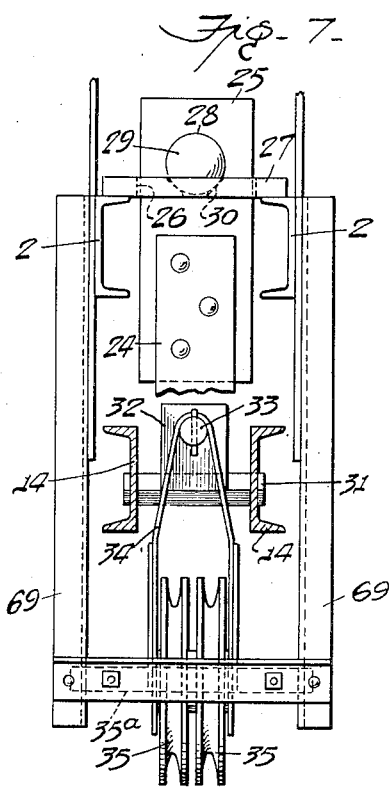
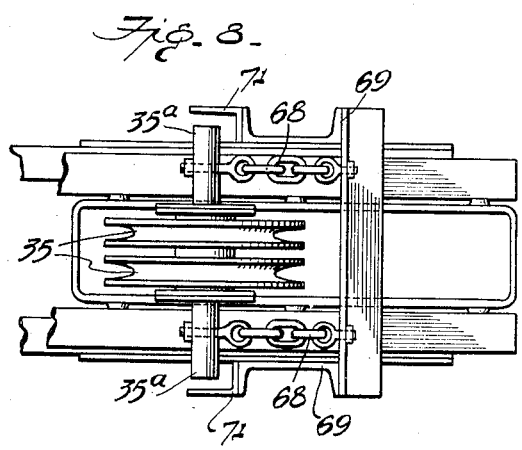
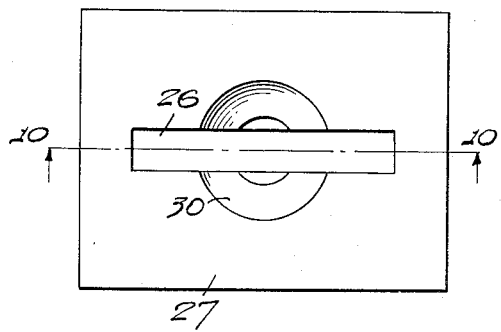
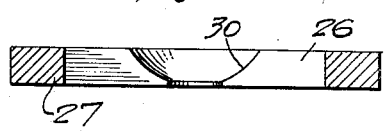
Inventor
Stanley G. Murray
John DeLotto
By
James L. Norris
Attorney Patented Sept. 5, 1933

1,925,773

UNITED STATES PATENT OFFICE 1,925,773

BOOM SCALE

Stanley G. Murray, Passaic, and John De Lotto, Belleville, N. J., assignors to Richardson Scale Company, Clifton, N. J., a corporation of New Jersey Application May 27, 1931. Serial No. 540,390

1 Claim. (Cl. 212—2)

The present invention relates to improvements in boom scales and more especially to those of the class adapted to be employed for picking up a load at one point and hoisting and swinging it to another point for deposit, for example, in a railway car or other receptacle, the present invention providing weighing means whereby the load may be weighed while suspended and en route from one point to the other.

The primary object of the invention is to provide novel and improved weighing means and to so mount such weighing means on the hoisting boom as to insure accuracy in the weighing of the loads and to enable the weighing operations to be performed rapidly and without interfering with the load hoisting or swinging operations.

To these and other ends, the invention consists in certain improvements and combinations and arrangements of parts all as will be hereinafter more fully described, the features of novelty being pointed out particularly in the claim at the end of the specification.

In the accompanying drawings:—

Fig. 2 is a top plan view of the boom scale on a smaller scale, showing the guy means therefor;

Fig. 3 is a detail diagrammatic view of the weighing mechanism;

Fig. 4 is a fragmentary vertical section taken on the line 4—4 of Fig. 1, on an enlarged scale;

Fig. 5 is a transverse section taken horizontally through the mast on the line 5—5 of Fig. 4;

Fig. 6 is a detail view, on an enlarged scale, of the outer end of the boom;

Fig. 7 is an end elevation, partly in section on the line 7—7 of Fig. 6;

Fig. 8 is a horizontal section taken on the line 8—8 of Fig. 6;

Fig. 9 is a detail view on an enlarged scale and in top plan, showing one member of the ball shackle which supports the weighing mechanism at the outer end of the boom;

Fig. 10 is a vertical section taken on the line 10—10 of Fig. 9;

Fig. 11 is a top plan view of a bull-wheel which may be used as hoisting means;

Fig. 12 is a side elevation of the bull-wheel shown in Fig. 11;

Fig. 13 is an enlarged detail sectional view of a portion of the brake on the base of the mast; and Fig. 14 is a section on the line 14—14 of Fig. 13.

Similar parts are designated by the same reference characters in the various views.

Figure 1:
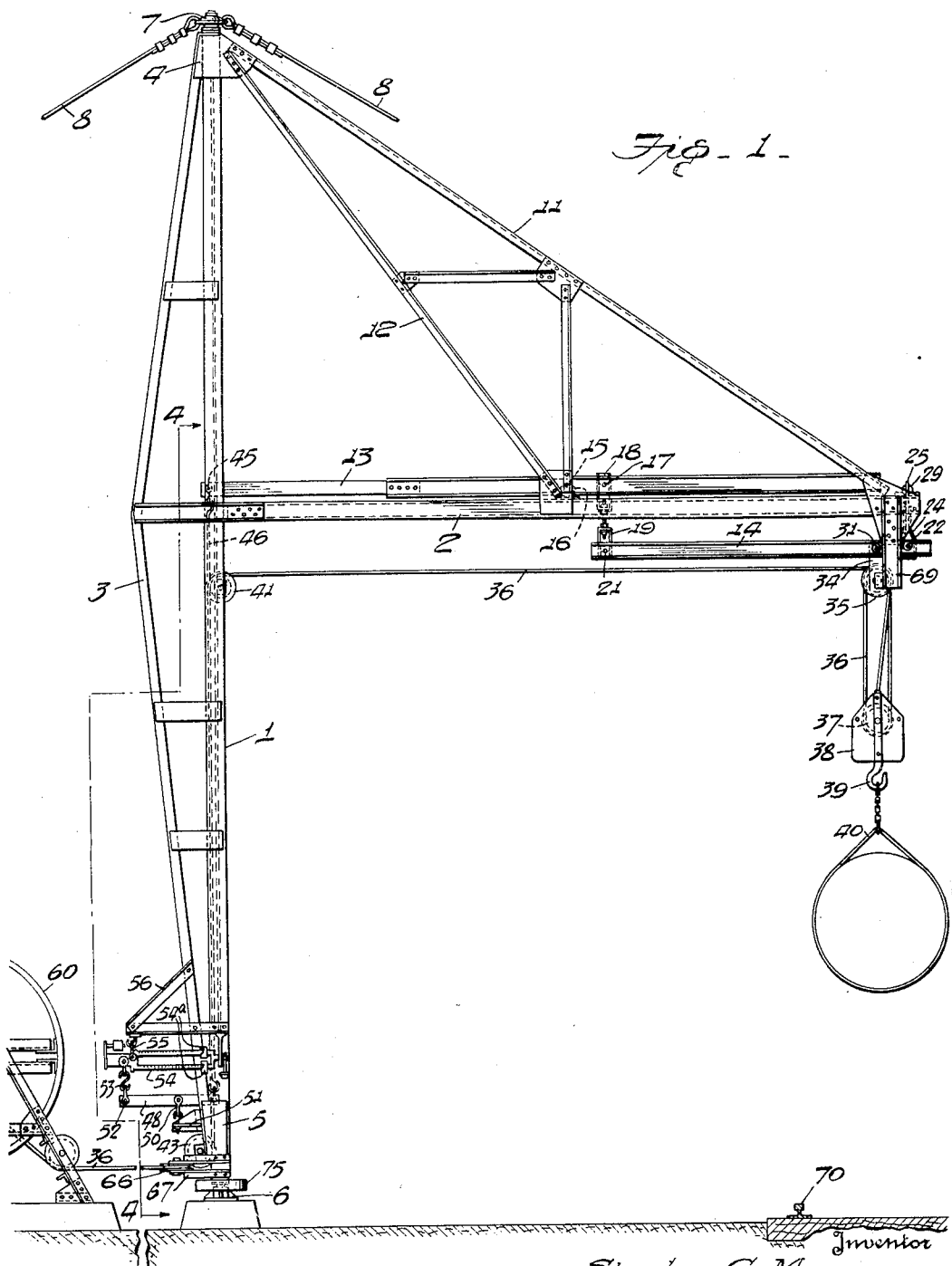
Fig. 1 is a side elevation of a boom scale constructed in accordance with the present invention.

The present invention is applicable generally to boom hoists or other derrick or hoisting mechanism of the class embodying a boom mounted to swing into different angular positions so that a load may be picked up and lifted from one point and swung into position for delivery at another point, the invention being especially applicable to cane bundle scales of the kind used for weighing and loading bundles of sugar cane into railway cars or other vehicles for transportation. The invention is shown in the present instance as applied to a cane bundle scale embodying one type of boom hoist, but it is to be understood that the invention is not restricted to such specific use, or to hoisting means of the type and construction shown since other equivalent constructions may be used and such will be included within the scope of the claim.

In the embodiment of the invention shown, 1 represents the upright mast and 2 the swinging boom of a hoisting derrick, the boom being fixed rigidly to the mast so that it extends horizontally and radially therefrom at a point preferably below the top thereof as shown, the boom being of fixed length, and the mast is preferably stiffened by a truss 3 the upper and lower ends of which are fixed to plates 4 and 5 which are in turn fixed to the respective ends of the mast. The lower end of the mast is mounted rotatably in a suitable foot-step bearing 6 supported by a suitable foundation, and the upper end of the mast is rotatably mounted in a bearing 7 located vertically above the bearing 6, the upper bearing 7 having a suitable number of guy wires 8 or other suitable supporting means connected thereto, the guy wires as shown extending to the ground and being attached at their lower ends to stakes 9 which may be driven into the ground or to other suitable anchoring means located properly around the mast to maintain it in upright position, turnbuckles 10 being preferably provided for the guy ropes or wires so that the mast may be maintained in vertical position. The outer end of the boom 2 may be supported by a tension member 11 which connects the outer end of the boom to the top of the mast, and the boom may be further supported intermediately of its length by a tension member 12 which connects such middle portion of the boom and the upper end of the mast. The derrick is constructed preferably from steel shapes, the mast being composed preferably of an I-beam which provides channels at its opposite sides which lie in the vertical plane of the boom, and the boom is preferably composed of a pair of channel irons suitably spaced apart transversely and secured in relatively fixed relation, the portion of the boom adjacent to the mast being secured to the flanges of the mast at the opposite sides thereof.

The boom 2 supports weighing means by which the load is weighed while suspended therefrom by the hoisting means which may be of different types, the weighing means for the type of hoisting means shown in the present instance comprising a pair of scale levers 13 and 14. The scale lever 13 is provided with a knife edge 15 which rests in a bearing 16 supported on the upper side of the boom near its center, and this scale lever is provided with a knife edge 17 at the outer side of the knife edge 15, the knife edge 17 supporting a knife edge bearing 18 on the upper end of a shackle 19, the lower end of this shackle carrying a knife edge bearing 20 in which rests a knife edge 21 on the inner end of the scale lever 14. The outer end of the scale lever 14 is provided with a knife edge 22 which rests in a knife edge bearing 23 and this knife edge bearing is carried by a shackle 24 which is suspended from the outer end of the boom 2. Preferably, the shackle 24 has a universal joint suspension from the boom so that the scale lever 14 will properly aline itself beneath the boom, the shackle 24 as shown being secured to a vertical plate 25 which extends upwardly through a transversely elongated vertical slot 26 in a bearing plate 27, the latter being mounted on top of and spanning the channel irons composing the boom, and the plate 25 above the bearing plate 27 having a circular hole 28 therein in which is placed a steel ball 29, the upper side of the plate 27 being formed with an annular or spherical depression 30 which is bisected diametrically by the slot 26. The resting of the ball 29 in the depression 30 retains the ball against displacement in either direction from the hole 28 in the plate 25 so that the ball will always support the plate 25 upon the plate 27, but the ball provides a universal pivot on which the plate 25 may rock in a direction either transversely or longitudinally of the boom.

In applying the invention to hoisting means of the fixed radius type, as shown in the present instance, the scale lever 14 is provided at a point between the knife edges 21 and 22 and near the knife edge 22 with a knife edge 31 on which a bearing block 32 rests, this bearing block being connected by a pin 33 to a shackle or block 34 which is suspended from said bearing block and carries the hoisting means at the outer end of the boom, the shackle or block 34 in the present instance carrying a pair of sheaves 35 over which a hoisting cable 36 passes, the hoisting cable below the sheaves 35 passing around the single sheave 37 of a block 38 which latter carries a hoisting hook 39 adapted to engage the sling 40 of a bundle of cane or to be otherwise engaged with the load to be hoisted and weighed, the block 38 being of sufficient weight to insure lowering thereof by gravity when free of load and the hoisting cable is slack. It will be understood that when the single and double sheave arrangement described is used, one end of the cable is attached to the sheave block 38 and then passes upwardly over one of the sheaves 35, thence downwardly under the single sheave 37 and then upwardly and over the other sheave 35. The hoisting cable 36 extends from the sheave 35 horizontally to a sheave or pulley 41 which may be revolubly mounted on the mast 1, it being shown projecting through a slot 42 formed in the web of the mast so that the periphery of this sheave is between the rear flanges of the mast, and the cable which extends over the sheave 41 then extends downwardly at the rear side of the mast in the channel between the flanges thereof and the cable then extends around a sheave or pulley 43 revolubly mounted on the mast near the lower end thereof to a suitable cable take-up or power means. The rear end of the scale lever 13 extends through a vertical slot 44 formed in the web of the mast so that this scale beam may operate freely in a vertical direction during the weighing operations, and the rear end of this scale lever is provided at the rear side of the web of the mast with a knife edge 45 to which is connected a vertical rod 46 the lower end of which is connected to a knife edge 47 on one end of a lever 48, the intermediate portion of this lever having a knife edge 49 which is connected by a shackle 50 to a bracket 51 fixed to the lower end of the mast and the other end of the lever 48 carries a knife edge 52 which is connected by a shackle 53 to a weigh beam 54 which may be of the usual construction employing sliding weights 54ª or the like for determining the weight of the load suspended by the hoisting means, the weigh beam being suspended by a shackle 55 from a bracket 56 rigidly supported on the lower portion of the mast. The rod 46 which connects the scale lever 13 to the lever 48 lies within the channel at the rear side of the mast. The shaft 35ª supporting the sheaves 35 is connected by a pair of horizontally extending flexible tension members 68, such as chains, to a bracket 69 which is rigidly attached to and extends downwardly from the outer end of the boom, these flexible members sustaining the hoisting tension or stress on the horizontally extending portions of the cable and thereby preventing displacement of the sheaves 35 although permitting vertical weighing movements of the scale lever 14 to take place. Angle plates 71 secured to the bracket 69 opposite to the ends of the sheave shaft 35ª limit the side play of said shaft under the side pull exerted on the sheaves when the cane bundles or other loads are dragged from various points around the mast.

Any suitable cable take-up or power means may be employed for pulling the cable 36 to hoist the load and for releasing the cable to lower the load, such means being preferably located in a position in rear of the mast. In the present instance, a so-called bull-wheel is shown as an example of such means, it comprising a drum 57 upon which the cable 36 is adapted to be wound, this drum being fixed on a shaft 58 journalled in a suitable stationary frame 59, and the shaft 58 has a drum 60 fixed thereto and on which a rope or cable 61 is wound, the cables 36 and 61 being wound in relatively opposite directions on the respective drums so that when the cable 61 is unwound from the drum 60 under the pull of a draft animal, or other power, the cable 36 will be wound upon the drum 57. A brake band 62 is fitted to a brake drum 63 and the brake band is controlled by a shaft 64 which is provided with a controlling lever 65 so that unwinding of the cable 36 from the drum 57 may be controlled by the attendant as desired to permit lowering of the load, the lever 65 being locked by a ratchet 72 fixed on the shaft 64 and cooperating with a ratchet pawl 73 pivoted at 74 and resting by gravity on the ratchet 72 and thereby holding the load suspended at any desired point, lifting of the pawl 73 disengaging it from the ratchet 72 and permitting operation of the lever 65 in a direction to release the brake band and allow lowering of the load.

Although the bull-wheel or other power means used may, as shown, be located in a position in rear of the derrick and the latter is mounted to swing into various angular positions about its vertical axis, means is provided for properly directing the cable 36 to the sheave or guide pulley 43 carried at the lower end of the rotatable mast irrespective of the angular position into which the mast may be swung, thereby preventing disarrangement of the hoisting cable relatively to this pulley. As shown, a pair of guide pulleys 66 are rotatably mounted on brackets 67 fixed to and extending rearwardly from the lower end of the mast, these pulleys being in rear of the sheave or pulley 43, the pulleys 66 being preferably grooved and having their peripheries arranged in close relationship and in substantially horizontal and vertical alinement with the lower side of the periphery of the sheave or pulley 43 so that while the cable 36 may extend more or less around one or the other of the guide pulleys 66, the cable will be guided so that it will properly pass around the sheave or pulley 43 which latter is preferably grooved as shown. In consequence, the derrick may be rotated through nearly a complete revolution about its vertical axis and the guide pulleys 66 will properly direct the hoisting cable 36 on to the sheave or pulley 43. Furthermore, since the axes of the guide pulleys 66 are located on the side of the mast opposite to that from which the boom extends, tension on the hoisting cable 36 will cause the hoisting cable to act on one or the other of the guide pulleys 66 and tend to swing the derrick until the boom is in line with the hoisting cable extending rearwardly from the derrick. For example, with the bull-wheel or hoisting means located in the position shown in Fig. 2 opposite to the rails 70 of a railway on which are cars to be loaded, if the boom is swung into either of the angular positions represented by the dotted lines in this figure to pick up a bundle of cane or other load, the tension applied to the hoising cable 36 will act on one or the other of the guide pulleys 66, which are offset relatively to the vertical axis about which the boom swings, to rotate the boom into full line position shown in this figure, thus bringing the load above a car on the railroad opposite to the derrick so that lowering of the load will deposit it into such car. In order to control or arrest entirely the swing of the boom, a controlling brake is provided, comprising a brake drum 75 fixed to the lower end of the mast and rotatable therewith, an internal brake band 76 having toggle or other means 77 for expanding it within the drum, and an operating lever 78 acting on the toggle or other operating means for expanding or releasing the band, a ratchet and pawl 79 being provided for the operating lever for holding the brake in set or released condition. In using such a brake, the hoisting hook would be positioned above the load before hoisting it and the swing of the boom controlled or prevented by the operator while standing at the base of the mast.

The operation of a boom scale constructed as hereinbefore described is as follows:—

Assuming that the derrick is used for loading cane from either or both sides thereof onto a car on the railway, the hoisting hook 39 is engaged with a bundle of cane or other load by swinging the boom to one side or the other, as for example, into the dotted line position indicated in Fig. 2, to bring it above the bundle or load and then lowering the hoisting hook, there being no substantial tension on the hoisting cable at this time so that the boom will remain in the lateral position into which it is swung. The boom is then held from swinging, as by setting the brake at the base of the mast, while hoisting of the load is accomplished by winding the hoisting cable 36 on the bull-wheel shown or in any other suitable or well known manner, the tension thus applied to the hoisting cable causing it to bear on one or the other of the relatively eccentric guide pulleys 66, thereby exerting a turning effort on the derrick which tends to swing the boom until it is substantially in line with the hoisting cable at the rear of the derrick, the boom however being held from turning by the brake until the load has been lifted high enough to clear the car or vehicle it is to be loaded into, whereupon the brake is released and the boom will then be swung by the turning effort of the hoisting cable, for example from the dotted line position into the full line position shown in Fig. 2, so that the bundle of cane or other load will be in position above a car on the railway, and by unwinding the hoisting cable or otherwise slackening the tension thereon, the bundle of cane or other load is lowered into the car.

While the bundle of cane or other load is suspended from the boom by the hoisting cable and the sheaves 35 and 37, it may be weighed, the weighing operation being preferably performed while the bundle of cane or other load is en route from the point where it is picked up to the point where it is deposited. The weighing is accomplished through the medium of the scale levers 13 and 14, the weigh beam 54 and the hereinbefore described operating connections between them. Since the sheaves 35 and 37 which suspend the load from the boom are suspended from the scale lever 14 which is operatively connected to the scale lever 13 and the latter is connected in turn through the rod 46 and lever 48 to the weigh beam 54, the weight of the load on these sheaves will pull the inner end of the scale lever 14 downwardly and will force the inner end of the scale lever 13 upwardly, the resultant upward pull on the rod 46 rocking the lever 48 on its fulcrum 49 causing the weight carrying end of the weigh beam 54 to swing upwardly until it is balanced by shifting of the sliding weights 54$^a$ whereupon the weight of the load will be indicated by the weigh beam in the manner usual in scales. Since the entire weight of the load is suspended by the knife edge 31 of the weighing mechanism, accuracy in the weighing operation is insured. Although the load is suspended by the hoisting cable while the weighing operation is taking place, no error will be introduced into the weighing operation by the hoisting cable since the portion of the hoisting cable which extends between the sheaves 35 and 41 extends horizontally or parallel to the scale levers 13 and 14 and the tension of said portion of the hoisting cable is balanced or sustained by the oppositely extending horizontal tension members 68, so that movements of the scale beams during the weighing operation may take place without interference by either the hoisting cable or said tension members and without producing differential tension on the hoisting cable, and variations in the tension on the hoisting cable or friction in the sheaves will not affect the accuracy of the weighing operation, so that the weighing operation may be carried on with accuracy even while the load is being lifted or lowered.

By using a rigid boom of fixed radial length and mounting the scale levers thereon as hereinbefore described, simplicity in the construction and operation of the weighing mechanism has been made possible, and by locating the beam rod 46 of the weighing mechanism in the channel at the rear side of the mast and between the flanges thereof, these parts of the weigh mechanism will be shrouded and thus protected from wind so that heavy winds such as those experienced in some localities, notably in the tropics, will have no effect upon the accuracy of the weighing operations. The suspension of the scale lever 14 by the ball and socket structure described insures hanging of the load freely and in a plumb position while suspended and self-alinement of said scale lever, and protects the knife edges of the weighing mechanism from injury since the strains at this point are considerable and may be in any direction due to dragging of the cane bundles along the ground in any direction and to swinging of the load while suspended. The invention enables loads to be picked up at any point in almost a complete circle around the center of the mast and swung to any other point around such center, the hoisting may be performed while the boom is swinging, and the load may be accurately weighed directly while suspended by the hoisting means and while the boom is swinging and deposited at any desired point within the same radius.

We claim as our invention:—

A boom scale comprising a boom rotatable on a vertical axis, weighing means carried by the boom, hoisting means including a hoisting cable and a cooperative sheave having a universal joint suspension from said weighing means for hoisting and suspending a load to be weighed, and means cooperative with said sheave for limiting movement thereof laterally of the boom.

STANLEY G. MURRAY.
JOHN DE LOTTO.